May 27, 1958     R. S. REINHOLD     2,836,267
LIGHTWEIGHT STRUCTURAL BODY AND PROCESS
OF FABRICATING THE SAME

Filed July 26, 1955     2 Sheets-Sheet 1

INVENTOR.
RICHARD S. REINHOLD

BY Reynolds, Beach
& Christensen
ATTORNEYS

May 27, 1958 R. S. REINHOLD 2,836,267
LIGHTWEIGHT STRUCTURAL BODY AND PROCESS
OF FABRICATING THE SAME
Filed July 26, 1955 2 Sheets-Sheet 2

INVENTOR.
RICHARD S. REINHOLD
BY
Reynolds, Beach + Christensen
ATTORNEYS

United States Patent Office 2,836,267
Patented May 27, 1958

2,836,267

LIGHTWEIGHT STRUCTURAL BODY AND PROCESS OF FABRICATING THE SAME

Richard S. Reinhold, Seattle, Wash., assignor to Boeing Airplane Company, Seattle, Wash., a corporation of Delaware Application July 26, 1955, Serial No. 524,402

6 Claims. (Cl. 189—34)

Structural bodies such as airfoils, for instance, must be extremely strong and rather rigid, yet must be of light weight. Frequently they are of special outlines or shapes, and because relatively few of any given style are required, they are virtually handmade. Normally, in order to satisfy the requirements of strength and relative rigidity with lightness, they are fabricated of sheet metal, such as an aluminum alloy, by cutting individual components and riveting or welding them together. All this requires a large amount of hand work, and because of the necessity for providing ample bearing surfaces and material surrounding rivet holes or spot welds, there is generally an amount of material added that increases quite appreciably the weight of the completed structure. In addition, the work required consumes many man-hours of skilled labor.

It is a primary object of the present invention to provide a lightweight structural body, which can be made with a minimum of material, hence, a minimum of weight, which will require no riveting nor spot welding whatsoever, which can be assembled prior to joining any of the components, and which can then be completed and all parts held firmly in their assembled relationship by a single, simple operation such as the foaming and hardening of a resin or similar material. This resin need not, and usually does not, fill all the space within the body, but only a minor portion of such space. The spaces thus filled are defined intermediate a corrugated stiffening sheet and an external skin, and transverse stiffeners are used intersecting the corrugations of the corrugated stiffener sheet. All these components are held together by the foaming and hardening of the resin or the like, and no other securing means need be employed in the usual case.

It has been proposed heretofore to employ corrugated stiffener sheets in conjunction with skins. Examples illustrating the above are found in the patent to Junkers No. 1,553,695, dated September 15, 1925; another example is found in the Berliner Patent No. 2,125,882 of August 9, 1938. However, in all such prior structures, and the Berliner patent is an example, a great deal of riveting is required to integrate the corrugated sheet with the skin and with any supporting or stiffening elements.

More recently the use of foamed resins has come into use in such lightweight structures, but so far as I am aware such resins have been used exclusively heretofore for either of two purposes, that is, for stiffening, as in the Ellison et al. Patent No. 2,693,922 of November 9, 1954, or in the De Havilland British specification No. 577,705, or else, for anchoring a fitting to an airfoil structure and for transmission of stresses between the two, as in the Stanley Patent No. 2,388,879 of November 13, 1945. It has not been realized, nor proposed, that the foamed resin can be used primarily for its bonding effect in holding together otherwise unconnected and loosely assembled structural stiffening elements. It is the latter purpose which is the primary aim of the present invention.

In the drawings, the principles of this invention are shown applied to a typical airfoil section, although it will be understood that the invention is readily adaptable to the construction of structures of other types, shapes, and sizes. The airfoil illustrated is a hollow body, but the invention is equally applicable to a body which is primarily a single skin and a stiffening and supporting structure for the same.

Figure 1:
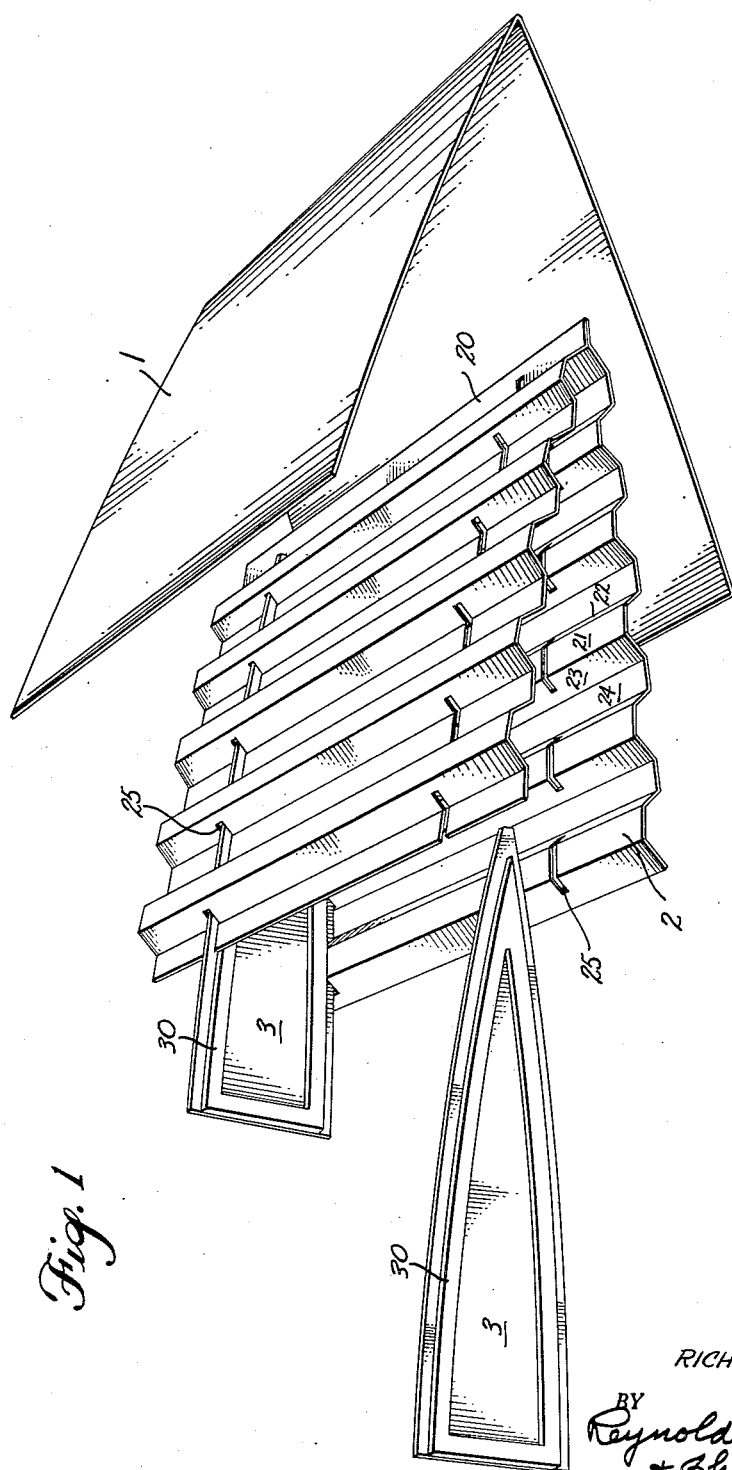
Figure 1 is an isometric view, showing the preassembly of the sheet metal structure, with some parts in fully engaged position and others in the process of engagement or positioning.

The patent to Roberts, No. 2,567,124, dated September 4, 1951, illustrates an airfoil structure comparable to the one chosen as illustrative in the drawings of this application. The Roberts patent illustrates quite well the numerous flanges, corner stiffeners and rivets or spot welds which are required according to conventional constructions, in order to complete such a light weight structure having adequate strength and rigidity.

A similar structure built according to the present invention includes three principal components, usually of sheet metal, namely, an external skin 1, a stiffener sheet 2, which is corrugated, and transverse stiffeners 3. The corrugations of the sheet 2 are preferably formed with a plurality of individual facets 21, 22, 23 and 24, which are angularly disposed relative to one another rather than rounded (although this is not strictly essential), defining parallel ridges and valleys. This corrugated sheet 2 is overlaid with the skin 1, substantially in contact with the corrugated sheet and exterior thereto, and by preference, the corrugations extend in the spanwise direction, if the structure be an airfoil. There may be two separate such corrugated sheets 2 at the sharp trailing edge, or the sheet may be bent back upon itself and thus be one continuous sheet. If there be two separate sheets, the normal procedure would be to secure them together at the trailing edge, as indicated at 20, and the securement might be by means of a plastic bond or by riveting or spot welding, or in any suitable fashion. Such securement, if required, is a simple operation, at an edge and wholly in the open.

The stiffener sheets 3 extend transversely to the corrugations and usually perpendicularly to the skin 1. The stiffener sheets 3 might, however, be disposed at an angle other than perpendicular to the surface of the skin 1, and may be cross-connected one to another by suitable bracing or trussing means, which, however, have been omitted from the drawings and would not usually be required.

These stiffener sheets 3 are received in aligned slots 25, cut into the corrugations of the corrugated sheet 2. The slots 25 extend only partway through the depth of the ridges of the corrugations, and the edges of the sheets 3 enter the slots 25 to a predetermined depth only.

Figure 2:
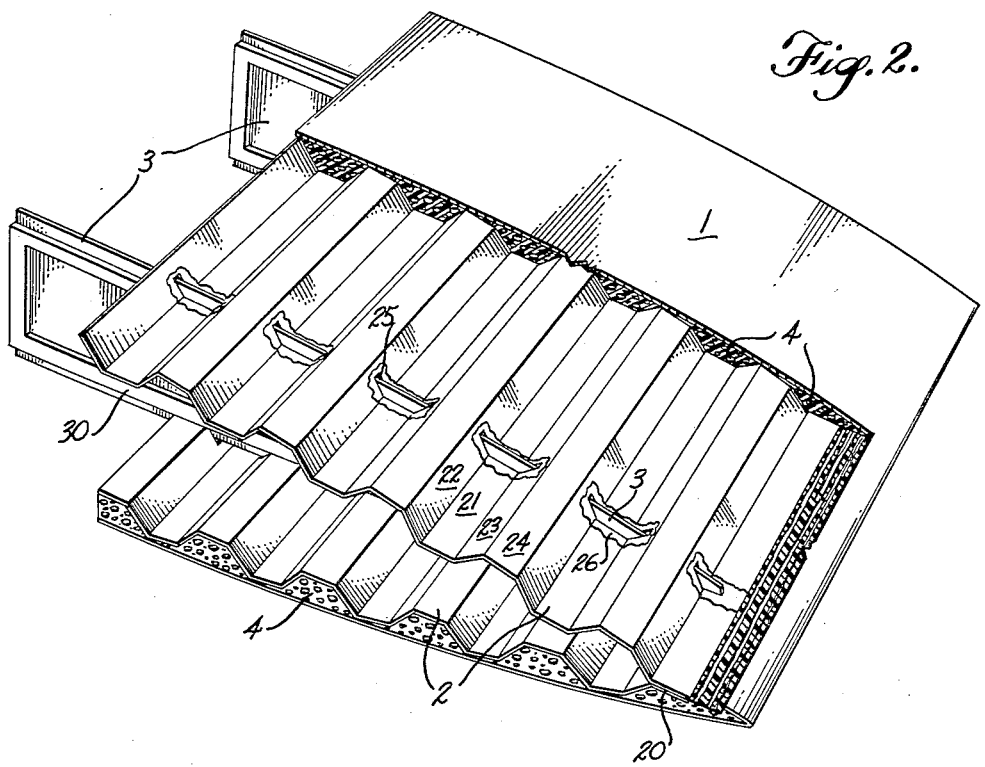
Figure 2 is a cutaway isometric view of a similar structure, with the parts now fully assembled and bonded together.
Figure 3:
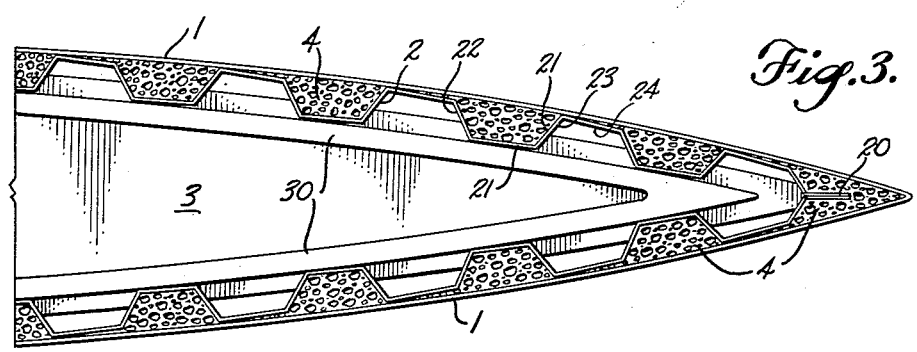
Figure 3 is a full end elevational view of the structure, with the parts as shown in Figure 2.
Figure 4:
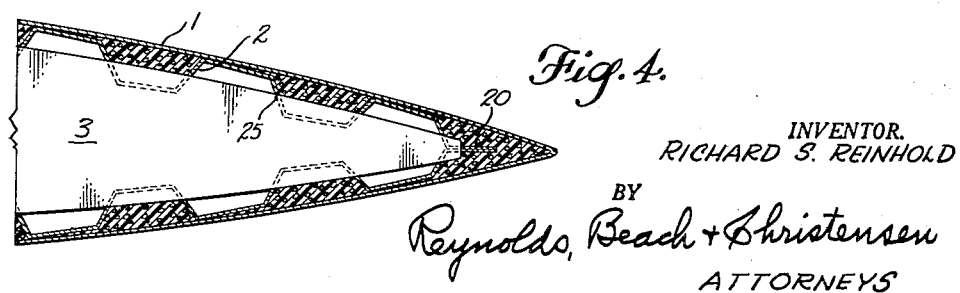
Figure 4 is a view similar to Figure 3, but illustrating a slight modification in the relationship of certain parts.

The gauging or determination of the depth of penetration of the edges of the sheets 3 into the corrugations of the sheet 2 may be determined by the location of the several parts in jigs, and without more, but preferably, gauge means which are interengageable between the sheets 2 and 3 are provided for determining the depth of such penetration. For instance, in the form shown in Figures 1 to 3, inclusive, the gauge means need consist of no more than strips 30 applied to one or to both faces of a sheet 3, inwardly from the edge thereof by a distance which, when the strip 30 engages the ridges of the corrugations, permits the edges of the sheet 3 to extend into the slots 25 to the predetermined distance. Such strips 30 serve the additional purpose of stiffening somewhat the stiffeners 3, particularly at their edges. On the other hand, in the form shown in Figure 4, the strips 30 are omitted, and the penetration of the edges of the sheets 3 is determined by the engagement of these edges with the bottoms of the slots 25, the latter being cut to the predetermined depth.

By either such provision, it is only necessary to cut the stiffener sheets 3 or the strips 30 thereof to a predetermined shape and to assemble them in proper relationship with the sheet 2 in order to determine the contour of the airfoil or other lightweight structure. The skin 1 can be continuous over both surfaces, if it is extended around the trailing edge of an airfoil, for instance. The skin contacts the outwardly directed ridges of the corrugations, and is thereby shaped to the desired contour.

It will be observed that with parts thus assembled, there will be formed a plurality of cells 21 defined by the facets 21, 22, and 23 and by the skin 1, respectively. These cells are substantially closed, except that it is preferred that the facets 24 stand away at a slight angle to the overlying skin 1, so that the space within each cell communicates with the slight gap or space thus left between each facet 24 and the skin 1.

The several sheet metal parts, having been thus formed and assembled, are held to the proper contour, as for instance in a jig, or by the application of a sealant resin at 26 wherever the edge of the stiffener sheets 3 penetrate the individual cells. It is only necessary now to fill the several cells, including the odd-shaped cell at the trailing edge which includes the edges at 20, with a suitable liquid plastic or resin, capable of being foamed and hardened, such as has been suggested in the prior art, for instance, in the Ellison Patent No. 2,693,922, referred to hereinabove. This resin is contained within the individual cells, defined by the facets 21, 22, and 23, and when foamed will penetrate also the slight gap between each facet 24 and the overlying skin 1. Because of the use of a sealant resin at 26, it may not escape from the cells, but is confined therein. Even if no sealant resin is used at 26, but little foamed resin will escape if the fit within the slots 25 is fairly tight. When foamed and hardened the resin completely fills all the space within each cell and materially stiffens the same and the structure as a whole, but in particular it serves as a bond between the sheet 2 and the skin 1, and between these two and the inserted portions of the edges of the sheet 3. In this manner it bonds together all three of the components 1, 2 and 3, and holds these three components firmly and quite rigidly together. Thus, in addition to the reinforcing function, it also can and usually does serve as the sole securing means between the several components of the structure. Thereby it eliminates or can eliminate completely the necessity of using any rivets, spot welds or other securing means, and accomplishes the securement and bonding of all the structural elements by the single and simple operation of foaming and hardening the filler material, such as is indicated at 4. Thereby not only is weight saved, but a large amount of painstaking labor. It is necessary only to cut the slots 25 to a predetermined depth or to locate the gauge strip 30 with accuracy, and then with the parts fully assembled and held in proper relationship, they are fixed in this relationship and reinforced and stiffened by the insertion, foaming, and hardening of the resin filler within the several cells at 4.

The trailing edge structure illustrated is to be taken merely as typical of many such structures that can be thus built and formed. It may be possible in some designs to construct an entire airfoil, such, for instance, as a flap or aileron, in this manner, or it may be preferred (as in the Roberts Patent No. 2,567,124, referred to hereinabove) to construct an airfoil of several individual parts, and to assemble them in operative relationship after completion of each part.

The process herein disclosed consists, as will be seen from the above, of first shaping the corrugated sheet 2 and its overlying skin 1 to the desired contour, whether in a jig or by virtue of the rib-like sheets 3 is immaterial. By so assembling the sheets 1 and 2 there are defined individual cells between the skin and each corrugation. The stiffener sheets 3 have their edges engaged within the cells with the sheets 3 oriented in planes at an angle to the corrugations and to the skin 1, the orientation being determined by entering the edges of the sheet 3 into the respective aligned slots 25 to a predetermined depth, as determined by the gauge strips 3 or by the depth of the slots 25, or in any other suitable manner. In any event, the edges of the stiffener strips 3 penetrate the individual cells, and thus when the cells, in the next step, are filled with a foamable and hardenable liquid, and the same is foamed and hardened to occupy the space within such cells (usually the entire space therein), the inserted edges of the stiffener sheets 3 are embraced by the foamed liquid, and upon hardening, this foamed liquid bonds together the two sheets 2 and 3, and the skin 1, in the space within and adjacent the individual cells. This bonding constitutes, in suitable cases, the sole means of securing together the several components 1, 2 and 3, although wherever it may be required, either for preliminarily fixing parts in positon or for additional strength and rigidity, additional securing means such as rivets or spot welds may be employed at suitable locations.

I claim as my invention:

1. A lightweight structural body comprising an external skin, a sheet having stiffening corrugations, disposed immediately beneath and contiguous to the skin, and extending in one direction to define cells intermediate the skin and each corrugation, planar stiffener sheets located at intervals in the length of the corrugations, and each disposed in a plane at an angle to the skin and transversely of the corrugations, the edge of each stiffener sheet intersecting the several corrugations, and the latter having slots admitting such planar stiffener sheet edge into the cells to a predetermined depth, less than the depth of the corrugations, and a hardened filler of foamed plastic material filling the cells and bonded to the skin, the corrugated sheet, and the inserted edges of the stiffener sheets, and constituting the primary means to consolidate them into a unitary assembly.

2. A lightweight structural body as in claim 1, including gauge means carried by the several stiffener sheets and contacting the corrugated sheet to limit the penetration of the stiffener sheet's edges through the slots into the several cells, during consolidation of the assembly.

3. A lightweight structural body as in claim 2, wherein the gauge means comprises a ledge outstanding from each stiffener sheet and extending along a line generally paralleling but spaced inwardly from the inserted edge of said stiffener sheet, in position to contact the ridges of the corrugations.

4. A lightweight structural body as in claim 1, wherein the stiffener sheets are disposed in planes which are generally perpendicular to the length of the corrugations and to the surface of the skin.

5. A lightweight structural body as in claim 1, wherein the slots in the corrugations are of a width to closely embrace the inserted edge of the stiffener sheets.

6. A lightweight structural body as in claim 1, wherein the corrugations are formed with angularly related, substantially flat facets, of which one contacts and lies close to the skin, said latter facet being slightly relieved in angle to leave a space wherein the plastic material constitutes an intimate bond directly between the skin and the corrugated sheet.

(References on following page)

References Cited in the file of this patent

UNITED STATES PATENTS

| | | |
|---|---|---|
| 1,207,389 | Ford | Dec. 5, 1916 |
| 1,875,188 | Williams | Aug. 30, 1932 |
| 2,125,882 | Berliner | Aug. 9, 1938 |
| 2,575,758 | Herd | Nov. 20, 1951 |
| 2,576,073 | Kropa et al. | Nov. 20, 1951 |

FOREIGN PATENTS

| | | |
|---|---|---|
| 577,705 | Great Britain | May 29, 1946 |
| 718,035 | Great Britain | Nov. 10, 1954 |
| 723,621 | Great Britain | Feb. 9, 1955 |